Aug. 12, 1969 — N. H. HORWITZ — 3,461,293

SPARK IMAGING DEVICE

Filed Dec. 21, 1967 — 2 Sheets-Sheet 1

INVENTOR
NORMAN H. HORWITZ
BY
Burton & Parker
ATTORNEYS

Aug. 12, 1969    N. H. HORWITZ    3,461,293
SPARK IMAGING DEVICE
Filed Dec. 21, 1967    2 Sheets-Sheet 2
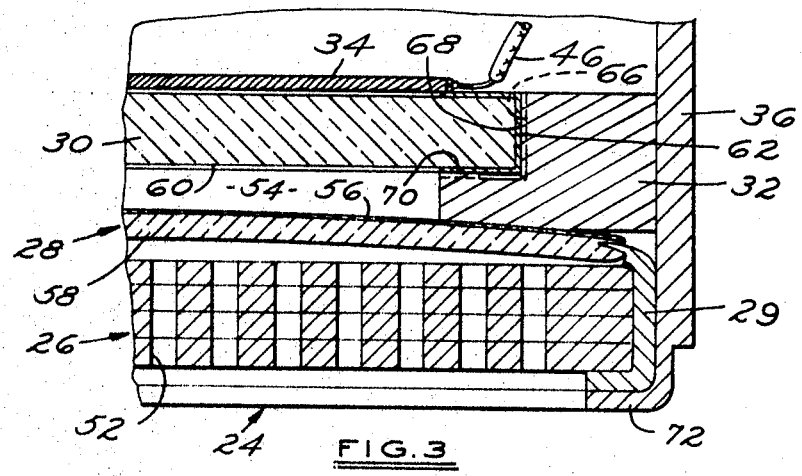
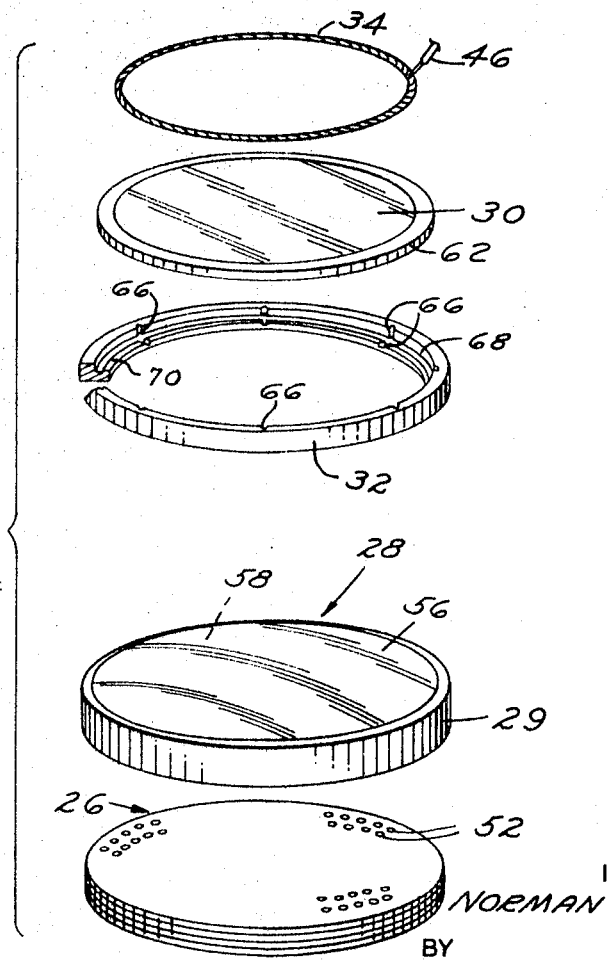
INVENTOR
NORMAN H. HORWITZ
BY
Burton & Parker
ATTORNEYS

United States Patent Office 3,461,293
Patented Aug. 12, 1969

3,461,293
SPARK IMAGING DEVICE
Norman H. Horwitz, Birmingham, Mich., assignor of one-half to James E. Lofstrom, Birmingham, Mich.
Filed Dec. 21, 1967, Ser. No. 692,443
Int. Cl. G01t 1/16; H01j 39/28; G01n 21/38
U.S. Cl. 250—83.6                                  17 Claims

ABSTRACT OF THE DISCLOSURE

This disclosure relates to a spark imaging device having a plate-like photosensitive cathode for subjection to the radiation to be imaged, a plate-like light transmitting anode spaced from the cathode opposite the source of radiation, and a gas medium capable of supporting a spark between the electrodes. An electrical field is maintained across the gas medium by a source of current, above the sparking potential of the gas, such that radiation impinging on the cathode creates a spark in the gas medium which may be visualized through the anode. The cathode is concave, having a central portion more closely spaced to the anode than the periphery, to minimize spurious discharges in the periphery. The cathode is a film of gold fired onto a supporting glass plate, in intimate heat transfer contact therewith, and the anode is connected to the source of current through a connector loop disposed adjacent the periphery of the anode, to evenly distribute the charge across the anode surface.

Field of the invention

This invention relates to an imaging device for imaging radiant energy, which may be used for mapping the distribtution of radiation.

Description of the prior art

The prior art includes a number of complex devices adapted to record the distribution of radiation; such devices generally utilize photo-cell circuits and photo-multipliers. A prior art device presently in use employs a technique called "scintillation scanning." This technique employs a rather complex detector which is shifted to scan over the surface of interest in a line at a time. The collimator is placed between the radiating source and the detector which absorbs stray radiation and limits the field of detection to a very small region of the radiating volume. The output of the detector activates a recording system in a series of pulses. The recording system includes a means for producing a dot on a sheet of paper or photographic film for each pulse produced by the scintillation counter. The recorder and the detector are synchronized so that the activity of the radiation source and the number of dots per unit of length on the recording correspond. Because the scintillation detector can only collect data over a limited area of emitting surface at any one time, the scanning is done in rows, like a typewriter, and the recording period ranges from twenty minutes to one hour, depending on the size, area, and intensity of radiation. Further, if the distribution of radiation is undergoing changes during the scanning process, the data will have a temporal lag between the initial and final parts of the scan.

The three major disadvantages of the scintillation scanner are; the long time interval required to obtain radiation distribution data, the inability to obtain temporal information about the radiation distribution, and the limitation on resolution made by the spacing of scanning rows in the collimator.

Other systems and techniques have been developed to overcome the disadvantages of the scintillation scanning device. Among these are the gamma-ray cameras and automatic fluoroscopes. In these systems the radiating surface is viewed through a multichannel collimator. The gamma ray emitted from the radiating surface penetrates the collimator and is stopped in a scintillator, a flash of light is produced at the site where the interaction takes place. The flash of light is viewed by a bank of photomultiplier tubes. The signals received from the photomultiplier tubes are compared to a complex comparison network which determines the point from which the radiation occurred. The comparison network feeds the data to an oscilloscope screen, which provides a visualization of the radiating source. The system may require as many as 19 photo-multiplier tubes, which, together with the complex electronic system, results in a very large cost and considerable bulk. Another imaging system, developed by Kurt F. Lyon, is disclosed in United States Patent No. 2,692,948.

The prior art also discloses a number of devices which are utilized to count or measure the intensity of the impinging radiation. Other devices, which may be considered of general interest, include image amplification tubes. The following U.S. patents are considered of general interest: 2,534,922, 2,534,932, 3,163,765, 3,235,737.

Summary of the invention

The spark imaging device of my invention includes a number of improvements over the basic invention, shown by application for United States Letters Patent S.N. 445,127, now Patent No. 3,412,246. The spark imaging device includes a plate-like photo-sensitive cathode for subjection to the radiation to be imaged, a plate-like light transmitting anode accurately spaced from the cathode on the side thereof opposite the source of the radiation, and a gas medium capable of supporting a spark between the electrodes. An electrical field is maintained across the gas medium by a source of current potential impressed across the electrodes, slightly above the sparking potential of the gas medium, sufficient to support a discharge avalanche within the medium upon secondary emission of photo-electrons from the cathode, generated by the impinging radiation.

The electrodes of the spark imaging device of my invention are more closely spaced at the central portion than the periphery to minimize spurious electrical discharges at the periphery of the electrodes. In the preferred embodiment, one of the electrodes is concave, with the central portion less than 4% closer than the periphery, to assure uniform sensitivity across the electrodes. The cathode may thus be spherical, with a large radius of curvature, such that the central portion is only slightly closer than the periphery.

In the preferred embodiment of the spark imaging device of my invention, the cathode is a film of gold in intimate heat transfer contact with a glass plate, such that the glass serves as a heat sink to dissipate the thermal energy of sparking. Gold has a greater stopping power than silver, which was used in the first embodiment of the spark imaging device disclosed in the above referenced application for United States patent because of its higher atomic number. And, I have discovered that gold is more passive as an electrode material, and the electrodes can therefore be overvoltaged significantly to increase the sensitivity of the device, and decrease the "dead time." The passivity of gold as a cathode is unexpected and the utilization of gold is considered an important advantage in spark imaging devices. In the preferred embodiment, the gold film is fired on the glass to assure intimate heat transfer contact.

The light-transmitting anode, in the preferred embodiment of my invention, is connected to the source of current potential through a ring connector, located adjacent the periphery of the anode, to distribute the potential evenly across the anode surface. The ring connector is preferably spaced slightly from the periphery of the anode to prevent arcing, and in the disclosed embodiment, the ring connector is connected to the anode opposite the cathode. The ring connector provides a dramatic improvement in the sensitivity of the device, and therefore is considered an important improvement in the spark imaging device of my invention.

Brief description of the drawings

FIGURE 3 is an exploded view of the electrode assembly and collimator shown in FIGURE 1; and FIGURE 4 is an enlarged side cross sectional view of the electrode assembly shown in FIGURE 1.

Description of the preferred embodiment

Figure 1:
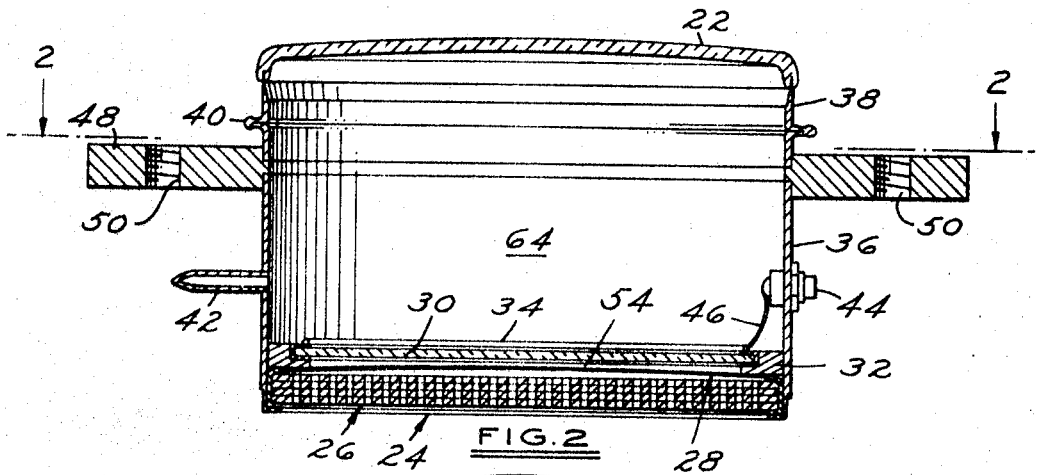
FIGURE 1 is a cross sectional view of one embodiment of the spark imaging device of my invention.
Figure 2:
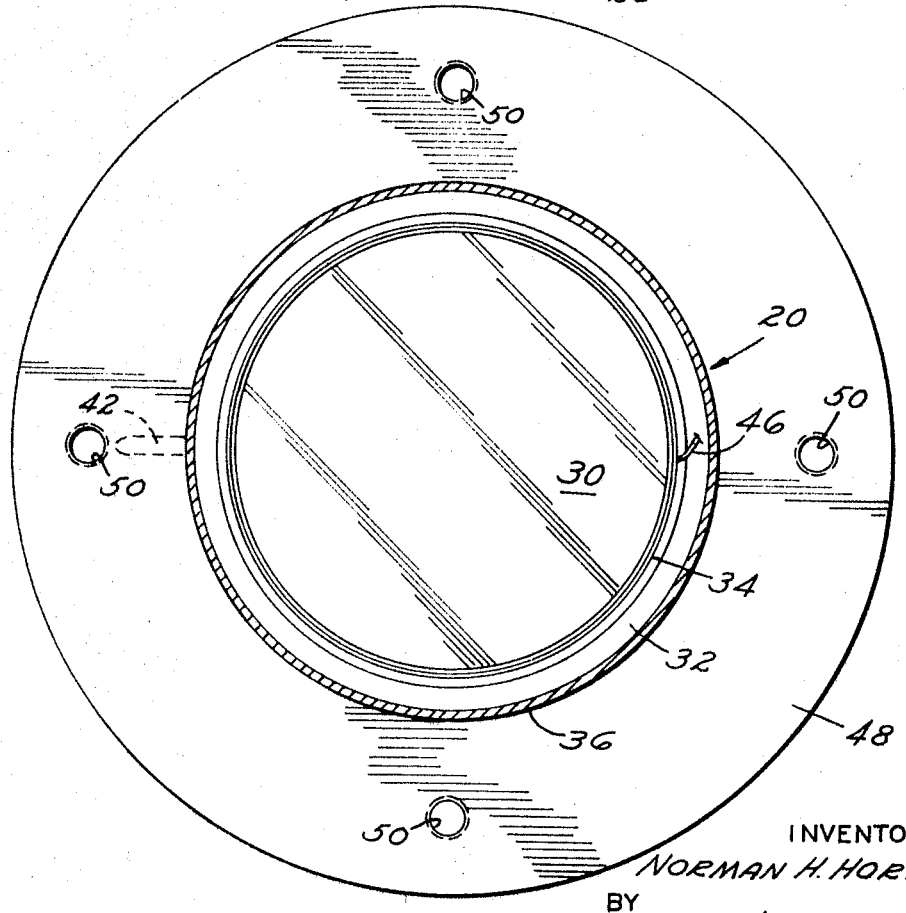
FIGURE 2 is a top cross sectional view of the embodiment shown in FIGURE 1, in the direction of the view arrows 2—2.

In the embodiment of my invention shown in the drawings, the spark imaging device includes a housing 20 having a glass "viewing port" 22, and an open end or radiation entrance port 24 which is positioned opposite the radiation source to be imaged. The spark imaging assembly, best shown in FIGURES 3 and 4, includes a laminated collimator 26, a plate-like photosensitive cathode 28, a plate-like light-transmitting anode 30, an annular spacer 32, and a ring connector 34. The cathode 28 is supported on a cylindrical metal sleeve 29, formed integral with the cathode, as shown in FIGURE 4. The housing is formed in two sections, 36 and 38, which are spun together at 40, to aid in assembly of the spark imaging assembly. The lower section 36 of the housing is provided with an evacuation and filling nipple 42, and an electrical connector 44, connected through wire 46 to the ring connector 34. This embodiment of the housing is provided with a mounting flange 48, having threaded apertures 50, adapted to secure the imaging device to another structural member, such as the recording camera described in the above referenced copending application for United States Patent.

The gamma rays or photons, which are emitted by the source to be studied, are linearly scattered in all directions. However, by absorbing rays which are not perpendicular to the axis of the discharge chamber, it is possible to determine the source of the radiation. The function of the collimator 26 is to absorb stray radiation, such that all of the radiation impinging upon the photosensitive cathode 28 is substantially perpendicular thereto. The collimator shown in the drawings is more fully described in the reference copending application for patent, and is constructed from accurately perforated sheets of lead, secured into a grid structure with alternate rows of perforations staggered. The sheets illustrated are 1/16 of an inch thick, having 1/8 inch circular perforations on 3/16 inch centers. The laminated collimator permits variance in the resolution of the spark imaging device by varying the number of laminations. This technique is an improvement over previous methods of making collimators, which required an accurately drilled lead plate, or individually aligned tubes.

The gamma rays emitted from the radiating source which are substantially perpendicular to the cathode 28, pass through the perforations 52 in the collimator to impinge upon the photosensitive cathode and produce secondary photo-electrons between the cathode 28 and the target anode 20. A gas medium capable of supporting a spark is provided in the space 54 between the cathode 28 and the anode 30, and an electric field is maintained across the electrodes by a source of potential, not shown, slightly above the sparking potential of the gas. As described in the referenced copending application for patent, the secondary photo-electrons emitted by the cathode causes localized breakdown of the gas medium which may be observed and recorded through the light-transmitting anode 30. The localized breakdown triggers a discharge avalanche in the gas medium, which produces a visible spark observable through the anode, localized to the region of interaction. The discharge avalanche, which is a cascade and multiplication of ions produced by the photo-electron, will travel the path of least resistance to the target anode 30, which are the lines of force of the electric field. An end view of a scintillation, or spark, appears as a dot through the anode, and is limited to the area of interaction.

The cathode, in this embodiment, is a gold film 56 deposited on a glass plate 58, as shown in FIGURE 4. The gold film 56 is preferably in intimate heat transfer contact with the glass plate 58, such that the glass serves as a heat sink to dissipate the thermal energy of sparking, and thereby prevents pitting. In the preferred embodiment, the gold film is fired on the glass to assure intimate contact and prevent pitting.

The cathode of a spark imaging device must include a photosensitive material to provide the requisite secondary photo-electrons in the gas medium between the electrodes. It must be a good conductor to provide an electrical potential across the anode and the cathode. It must be thick enough to assure interaction with the impinging gamma radiation and thin enough to allow escape of secondary photo-electrons on excitation by the impinging radiation. And, it is preferably opaque to improve visualization of sparks produced between the electrodes, through the anode. A film of silver was previously used for the cathode material. However, gold has been found to provide several advantages over silver. Gold has a greater stopping power than silver because of its higher atomic number. Gold is also more passive as an electrode material than silver, and the electrodes can therefore be significantly overvoltaged to increase the sensitivity of the spark imaging device and decrease the dead time.

In this embodiment of the spark imaging device of my invention, the cathode is concave, toward the anode, such that the central portion is more closely spaced to the anode than the periphery, as shown in FIGURE 4. The concave configuration of the cathode limits spurious electrical discharges at the periphery, and the smooth contour assures uniform sensitivity across the electrodes. The curvature of the cathode shown in FIGURE 4 has been exaggerated to aid in the description, and in the preferred embodiment the cathode is spherical with a relatively large radius of curvature, compared to the diameter of the cathode. For example: In a seven or nine inch diameter cathode, the spacing between the electrodes at the periphery is approximately 0.125 inch, and the central portion is only 0.002 inch closer to the anode than the periphery. This apparently relatively insignificant curvature does, however, substantially increase the resolution of the device and, therefore, is considered an important over "flat" electrodes in a spark imaging device.

The gas medium may be selected from several gases capable of supporting a spark, such as argon or neon. The gas medium preferably includes a quenching agent, such as iodine vapor to prevent spurious electron discharges. Argon is presently preferred, however, because of its better visualization properties. The electrical potential applied across the electrodes 28 and 30 will depend upon the inert gas used. An operating voltage of approximately 1500 volts has been found suitable for neon, and 2300 has been found suitable for argon, for the electrode spacing described.

The target anode 30 is a transparent electrically conductive glass plate which has been described in the referenced copending application for patent and may be similar to that described in United States Patent No.

2,695,247, Example 1. The anode surface 60, opposite the cathode, has a relatively transparent conductive film, which may be stannous oxide or silver, applied according to the method described in the referenced patent. Electrically conductive glass is preferred for two reasons: because of its inherent resistance of 50 to 10,000 ohms per square of anode, which prevents "drain off" of the charge across the entire surface of the anode and spurious electrical discharges, and its transparency which allows visualization and recording of the spark activity between electrodes. A surface resistance of 50 to 300 ohms per square of anode is preferred. The periphery 62 of the anode has been coated with a conductive material, such as indium solder or silver, to provide electrical contact with the connector 44. In the preferred embodiment of the spark imaging device of my invention, the anode is provided with a ring connector 34 which distributes the potential evenly about the periphery of the anode. The ring connector is preferrably spaced from the peripheral edge of the anode to prevent arcing of the charge. In the disclosed embodiment, the ring connector is a silver braid connected to the wire 46. The ring connector provides a dramatic improvement in the sensitivity of the spark imaging device of my invention by reducing spurious discharges and "false" images.

The electrodes of the spark imaging assembly function similar to an electronic capacitor, and the spark discharges are a controlled leakage across the capacitor, which causes a momentary break-down in the path of the discharged avalanche. The charge on the anode will tend to drain along this break-down to cause a sustained discharge across the capacitor, and a complete drain-off of the anode charge. The surface resistance of the anode, described above, will limit this drain-off of anode charge to a relatively small area and provide an optimum discharge limited to the area of interaction. Further quenching means, including a quenching agent in the gas medium or an electronic quenching means, is more fully described in the above reference application for United States Patent.

The gas medium is contained in the housing chamber 64 and is permitted to circulate between the electrodes through vents 66 in the annular spacer 32. The spacer 32 is provided with a counterbore 68 which receives the annode and an inner shoulder 70; the latter supporting the anode above the bottom of the counterbore to permit free circulation of the gas medium between the electrodes. The inert gas contained within the chamber 64 must be free of oxygen and other contaminants to obtain optimum sparking. The presence of iodine vapor in the discharge chamber tends to prevent spurious and unwanted discharge between the electrodes, as described above. A technique which has been found satisfactory to charge the chamber, when the electrodes are relatively thin and therefore subject to collapse, is to simultaneously draw a vacuum on the chamber 64 through the evacuation and charging nipple 42, while drawing the same vacuum on the outside of the chamber, through the open end 24, with a pumping cap, not shown. When the pressure has been reduced to less than one micron, a few milligrams of iodine, dissolved in ethyl or methyl alcohol, is added to the chamber 64. The chamber is then back-filled with inert gas, and air is simultaneously allowed into the pumping cap outside the cathode 58. The pumping cap may be attached over the open end 24 of the chamber. The lower end of the housing 36 is provided with an integral sleeve portion 72, as shown in FIGURE 4, which is rolled inwardly to seal the end of the chamber as shown.

It will be understood by those skilled in the art that various modifications may be made to the embodiment of the spark imaging device of my invention disclosed, without departing from the purview of my invention. For example: The housing and supporting assembly for the electrodes may be modified as required by the particular application for the spark imaging device. For example: The electrode assembly may be housed in a single glass envelope having an internal shoulder to support the electrodes. The glass plate which supports the gold cathode film may be the end of the glass envelope.

What is claimed is:

1. A spark imaging device, including a plate-like photosensitive cathode for subjecting to the radiation to be imaged, a plate-like light-transmitting anode accurately spaced from the cathode on the side thereof opposite the source of the radiation, a gas medium capable of supporting a spark between the electrodes, and an electric field maintained across said medium sufficient to support a discharge avalanche within the medium upon secondary emission from said cathode, the central portion of said electrodes being more closely spaced than the periphery to minimize spurious electrical discharges at the periphery.

2. The spark imaging device defined in claim 1, characterized in that one of said electrodes is concave with the central portion more closely spaced to the other electrode than the periphery.

3. The spark imaging device defined in claim 2, characterized in that said central portion of the concave electrode, is less than 4% closer to the opposite electrode than the periphery.

4. The spark imaging device defined in claim 2, characterized in that the concave electrode, is generally spherical having a relatively large radius of curvature, such that said central portion is only slightly closer to the other electrode than the periphery to provide uniform sensitivity across the electrodes.

5. The spark imaging device defined in claim 1, characterized in that said cathode, is generally spherical and having a central portion less than 3% closer to said anode than the periphery of said cathode.

6. The spark imaging device defined in claim 1, characterized in that said cathode, comprises a film of gold on glass in intimate heat transfer contact with the glass to dissipate the thermal energy of sparking.

7. The spark imaging device defined in claim 6, characterized in that said film of gold, is fired into the glass.

8. The spark imaging defined in claim 1, characterized in that said electric field, is provided by a source of current impressed across the electrodes and said anode including a loop connector adapted to distribute the potential from said source to the surface of said anode.

9. The spark imaging device defined in claim 8, characterized in that said loop connector, is a wire conductor in electrical contact with said anode adjacent its periphery.

10. The spark imaging device defined in claim 9, characterized in that said wire conductor, is soldered to said anode opposite the conducting surface of said anode in electrical contact with a portion of said anode.

11. A spark imaging device, including a plate-like photosensitive cathode for subjection to the radiation to be imaged, a plate-like light-transmitting anode accurately spaced from the cathode on the side thereof opposite the source of the radiation, a gas medium capable of supporting a spark between the electrodes, and a source of current potential connected across the electrodes for impressing a voltage therebetween above the sparking potential of the gas medium to support a discharged avalanche in said medium, said anode connected to said current potential through a ring connector adjacent the periphery of said anode distributing the potential evenly across the surface of said anode.

12. The spark imaging device defined in claim 11, characterized in that said anode is a transparent metal film opposite said cathode, and said ring connector is connected to said anode opposite the conducting film.

13. The spark imaging device defined in claim 12, characterized in that said anode includes a conducting surface about the periphery of said anode in electrical contact with said ring connector.

14. The spark imaging device defined in claim 11, characterized in that one of said electrodes is concave, with the central portion more closely spaced to the other electrode than the periphery to minimize spurious electrical discharges at the periphery.

15. The spark imaging device defined in claim 11, characterized in that said cathode is generally spherical having a relatively large radius of curvature, such that the central portion is only slightly closer than the periphery to the other electrode to provide uniform sensitivity across the electrodes.

16. The spark imaging device defined in claim 11, characterized in that said cathode comprises a film of gold on glass in an intimate heat transfer contact with the glass to dissipate the thermal energy of sparking.

17. The spark imaging device defined in claim 16, characterized in that said film of gold is fired onto the glass.

References Cited

UNITED STATES PATENTS

| | | | |
|---|---|---|---|
| 2,534,922 | 12/1950 | Marshall | 250—83.6 |
| 2,534,932 | 12/1950 | Sun | 250—83.6 |
| 2,692,948 | 10/1954 | Lion | 250—83.6 X |
| 2,942,109 | 6/1960 | Bell et al. | 250—71.55 |
| 3,076,895 | 2/1963 | Baldwin | 250—83.1 |
| 3,163,765 | 12/1964 | Niklas. | |
| 3,235,737 | 2/1966 | Niklas | 250—83.3 X |

RALPH G. NILSON, Primary Examiner

A. B. CROFT, Assistant Examiner

U.S. Cl. X.R.

250—71; 313—93, 100, 217